United States Patent
Terry et al.

(10) Patent No.: US 9,749,951 B2
(45) Date of Patent: Aug. 29, 2017

(54) IMPLICIT DRX CYCLE LENGTH ADJUSTMENT CONTROL IN LTE_ACTIVE MODE

(71) Applicant: INTERDIGITAL TECHNOLOGY CORPORATION, Wilmington, DE (US)

(72) Inventors: Stephen E. Terry, Northport, NY (US); Peter S. Wang, E. Setauket, NY (US); Jin Wang, Princeton, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 14/664,002

(22) Filed: Mar. 20, 2015

(65) Prior Publication Data

US 2015/0195782 A1    Jul. 9, 2015

Related U.S. Application Data

(63) Continuation of application No. 13/535,915, filed on Jun. 28, 2012, now Pat. No. 9,014,032, which is a
(Continued)

(51) Int. Cl.
*H04W 4/00* (2009.01)
*H04W 52/02* (2009.01)
*H04W 76/04* (2009.01)

(52) U.S. Cl.
CPC ..... *H04W 52/0212* (2013.01); *H04W 76/048* (2013.01); *H04W 52/0216* (2013.01); *Y02B 60/50* (2013.01)

(58) Field of Classification Search
USPC ..... 370/252, 311, 329, 338; 455/343.2, 420, 455/436, 445, 450, 502, 574
See application file for complete search history.

(56) References Cited

U.S. PATENT DOCUMENTS

| | | | |
|---|---|---|---|
| 7,548,519 B2 | 6/2009 | Motegi et al. | |
| 7,872,986 B2 * | 1/2011 | Chun | H04W 76/048 370/252 |

(Continued)

FOREIGN PATENT DOCUMENTS

| | | |
|---|---|---|
| CN | 1379963 A | 11/2002 |
| EP | 0536099 A1 | 4/1993 |

(Continued)

OTHER PUBLICATIONS

3rd Generation Partnership Project (3GPP), R2-061200, "Paging for LTE", QUALCOMM Europe, 3GPP TSG-RAN WG 2 meeting #53, Shanghai, China, May 8-12, 2006, pp. 1-3.
(Continued)

*Primary Examiner* — Kevin C Harper
*Assistant Examiner* — Mon Cheri Davenport
(74) *Attorney, Agent, or Firm* — Condo Roccia Koptiw LLP

(57) ABSTRACT

A method for controlling discontinuous reception in a wireless transmit/receive unit includes defining a plurality of DRX levels, wherein each DRX level includes a respective DRX cycle length and transitioning between DRX levels based on a set of criteria. The transitioning may be triggered by implicit rules.

19 Claims, 8 Drawing Sheets

Related U.S. Application Data continuation of application No. 12/022,233, filed on Jan. 30, 2008, now Pat. No. 8,238,260.

(60) Provisional application No. 60/887,276, filed on Jan. 30, 2007.

(56) References Cited

U.S. PATENT DOCUMENTS

| | | | |
|---|---|---|---|
| 7,916,675 B2 | 3/2011 | Dalsgaard et al. | |
| 8,238,260 B2* | 8/2012 | Terry | H04W 52/0212 370/252 |
| 8,755,313 B2* | 6/2014 | Damnjanovic | H04W 52/02 370/311 |
| 9,014,032 B2* | 4/2015 | Terry | H04W 52/0212 370/252 |
| 2002/0006805 A1 | 1/2002 | New et al. | |
| 2004/0087320 A1 | 5/2004 | Kim et al. | |
| 2005/0006829 A1 | 1/2005 | Chow et al. | |
| 2005/0032555 A1 | 2/2005 | Jami et al. | |
| 2005/0101695 A1 | 5/2005 | Wada et al. | |
| 2005/0148348 A1 | 7/2005 | Cramby et al. | |
| 2005/0153751 A1 | 7/2005 | Bultan et al. | |
| 2005/0176474 A1 | 8/2005 | Lee et al. | |
| 2006/0195576 A1 | 8/2006 | Rinne et al. | |
| 2007/0133479 A1 | 6/2007 | Montojo et al. | |
| 2007/0218835 A1 | 9/2007 | Hindelang et al. | |
| 2007/0291673 A1* | 12/2007 | Demirhan | H04W 52/0216 370/311 |
| 2007/0291729 A1 | 12/2007 | Dalsgaard et al. | |
| 2008/0046132 A1* | 2/2008 | Dalsgaard | G05D 23/19 700/299 |
| 2008/0167089 A1 | 7/2008 | Suzuki et al. | |
| 2008/0225772 A1 | 9/2008 | Xu | |
| 2008/0232284 A1 | 9/2008 | Dalsgaard et al. | |
| 2008/0232310 A1 | 9/2008 | Xu | |
| 2008/0293426 A1 | 11/2008 | Kim et al. | |
| 2009/0268689 A1 | 10/2009 | Fu et al. | |

FOREIGN PATENT DOCUMENTS

| | | |
|---|---|---|
| EP | 1499144 A1 | 1/2005 |
| EP | 1511337 A1 | 3/2005 |
| EP | 1613107 A2 | 1/2006 |
| JP | 04-120920 A | 4/1992 |
| JP | 2002-528009 A | 8/2002 |
| JP | 2003-179539 A | 6/2003 |
| JP | 2005-039471 A | 2/2005 |
| JP | 2005-057787 A | 3/2005 |
| JP | 2005-260906 A | 9/2005 |
| RU | 2120181 C1 | 10/1998 |
| RU | 2216100 C2 | 11/2003 |
| RU | 2262196 C2 | 10/2005 |
| TW | 2006-33555 A | 9/2006 |
| WO | WO 00/22837 A2 | 4/2000 |
| WO | WO 2005/067172 A1 | 7/2005 |
| WO | WO 2005/117299 A1 | 12/2005 |
| WO | WO 2006/039812 A1 | 4/2006 |
| WO | WO 2006/118411 A2 | 11/2006 |
| WO | WO 2006/135187 A2 | 12/2006 |
| WO | WO 2007/149732 A1 | 12/2007 |

OTHER PUBLICATIONS

3rd Generation Partnership Project (3GPP), R2-070088, "Summary of Email Discussion on DRX in LTE_ACTIVE", Panasonic (Email Rapporteur), 3GPP TSG RAN WG2 #56bis, Sorrento, Italy, Jan. 15-19, 2007, 9 pages.

3rd Generation Partnership Project (3GPP), R2-070120, "DRX Control in LTE_ACTIVE", ETRI, 3GPP TSG RAN WG2 #56bis, Sorrento, Italy, Jan. 15-19, 2007, 2 pages.

3rd Generation Partnership Project (3GPP), R2-070265, "DRX Scheme", LG Electronics, 3GPP TSG-RAN WG2 #56bis, Sorrento, Italy, Jan. 15-19, 2007, 4 pages.

3rd Generation Partnership Project (3GPP), R2-070279, "Views on DRX/DTX Control in LTE", NTT DoCoMo, Inc., 3GPP TSG RAN WG2 #56bis, Sorrento, Italy, Jan. 15-19, 2007, 3 pages.

3rd Generation Partnership Project (3GPP), R2-070896, "Draft2 Minutes of the 56bis TSG-RAN WG2 Meeting", 3GPP Support Team, TSG-RAN WG2 Meeting #57, Sorrento, Italy, Jan. 15-19, 2007, 82 pages.

3rd Generation Partnership Project (3GPP), TS 25.331 V8.1.0, "Technical Specification Group Radio Access Network, Radio Resource Control (RRC), Protocol Specification (Release 8)", Dec. 2007, pp. 1-1471.

3rd Generation Partnership Project (3GPP), TS 36.300 V0.3.1, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Nov. 2006, pp. 1-72.

3rd Generation Partnership Project (3GPP), TS 36.300 V8.3.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Dec. 2007, pp. 1-121.

$3^{rd}$ Generation Partnership Project (3GPP), TS 25.304 V3.14.0, "$3^{rd}$ Generation Partnership Project; Technical Specification Group Radio Access Network; User Equipment (UE) procedures in idle mode and procedures for cell reselection in connected mode (Release 1999)", Mar. 2004, 41 pages.

$3^{rd}$ Generation Partnership Project (3GPP), TS 25.331 V3.21.0, $3^{rd}$ Generation Partnership Project; Technical Specification Group Radio Access Network; Radio Resource Control (RRC) protocol specification (Release 1999), Dec. 2004, 879 pages.

$3^{rd}$ Generation Partnership Project (3GPP), "Fast setup for PS services (CELL PCH & URA PCH)", NEC, Tdoc R2-063413, TSG-RAN2 Meeting # 56, Riga, Latvia, Nov. 6-10, 2006, 9 pages.

* cited by examiner

IMPLICIT DRX CYCLE LENGTH ADJUSTMENT CONTROL IN LTE_ACTIVE MODE

CROSS REFERENCE TO RELATED APPLICATIONS

This application is a continuation of U.S. patent application Ser. No. 13/535,915, filed Jun. 28, 2012, which is a continuation of U.S. patent application Ser. No. 12/022,233, filed Jan. 30, 2008; which issued as U.S. Pat. No. 8,238,260 on Aug. 7, 2012, which claims the benefit of U.S. Provisional Patent Application No. 60/887,276, filed Jan. 30, 2007, the contents of which are incorporated by reference herein.

FIELD OF DISCLOSURE

The present invention is in the field of wireless communications.

BACKGROUND

A goal of the Third Generation Partnership Project (3GPP) Long Term Evolution (LTE) program is to develop new technology, new architecture and new methods for settings and configurations in wireless communication systems in order to improve spectral efficiency, reduce latency and better utilize the radio resource to bring faster user experiences and richer applications and services to users with lower costs.

In a typical LTE network, a wireless transmit/receive unit (WTRU) may operate in a number of modes. While in LTE_ACTIVE mode, the WTRU may operate in a discontinuous reception (DRX) mode. DRX mode allows the WTRU to operate in a low power, or sleep mode, for a preset time, and then switch to a full power, or awake, mode for another preset time in order to reduce battery consumption. The DRX cycle lengths are generally configured by the enhanced universal terrestrial radio access network (E-UTRAN) so that an enhanced Node B (eNB) and the WTRU are synchronized on a consistent sleep and wake-up cycle.

Live traffic situations and WTRU mobility may require frequent adjustment of the DRX cycle length in order to balance system performance, WTRU performance and WTRU power savings. However, relying only on WTRU/E-UTRAN signaling to make the fine DRX cycle adjustment may incur a heavy system and WTRU signaling load.

Implicit rules for DRX cycle length adjustment may be used for smooth LTE_ACTIVE DRX operations to reduce battery power consumption while not effecting system or WTRU performance issues. Implicit rules may assist the implicit DRX cycle length transitions between the WTRU and the E-UTRAN without using excessive explicit signaling.

SUMMARY

A method and apparatus are disclosed for controlling discontinuous reception in a WTRU. The method may include defining a plurality of DRX levels, wherein each DRX level includes a respective DRX cycle length, and transitioning between DRX levels based on a set of criteria. Transitioning may be triggered by implicit rules. Triggering may be invoked by a measurement event, a timer, a counter or a downlink command, for example. The transitions between DRX states may occur without explicit signaling.

BRIEF DESCRIPTION OF THE DRAWINGS

A more detailed understanding may be had from the following description, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
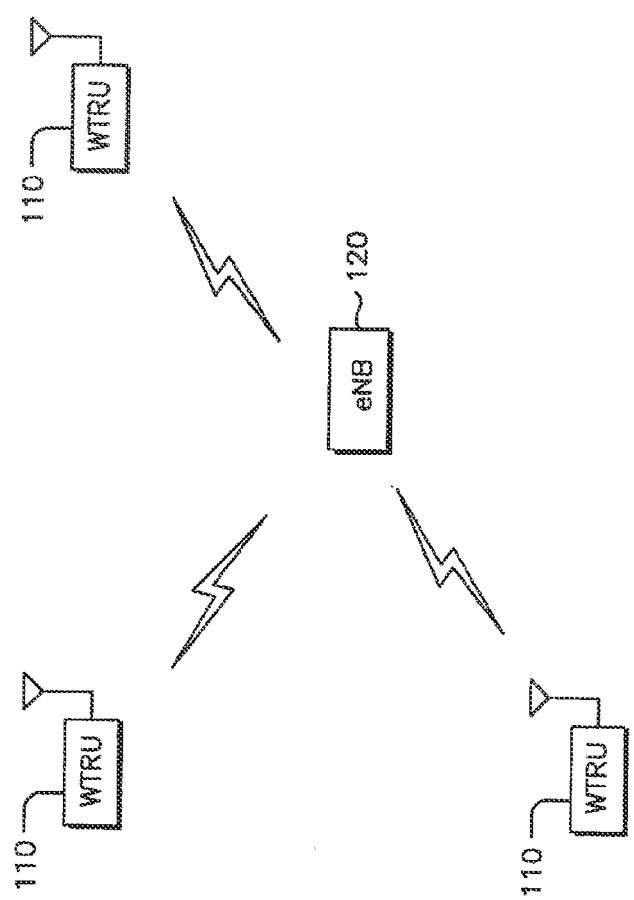
FIG. 1 shows a wireless communications system in accordance with one embodiment.

FIG. 1 shows a wireless communication system 100 in accordance with one embodiment. The system 100 includes a plurality of WTRUs 110 and an eNB 120. As shown in FIG. 1, the WTRUs 110 are in communication with the eNB 120. Although three WTRUs 110 and one eNB 120 are shown in FIG. 1, it should be noted that any combination of wireless and wired devices may be included in the wireless communication system 100. The eNB 120 and the WTRUs 110 may communicate while in DRX mode and may have coordinated DRX cycles.

Figure 2:
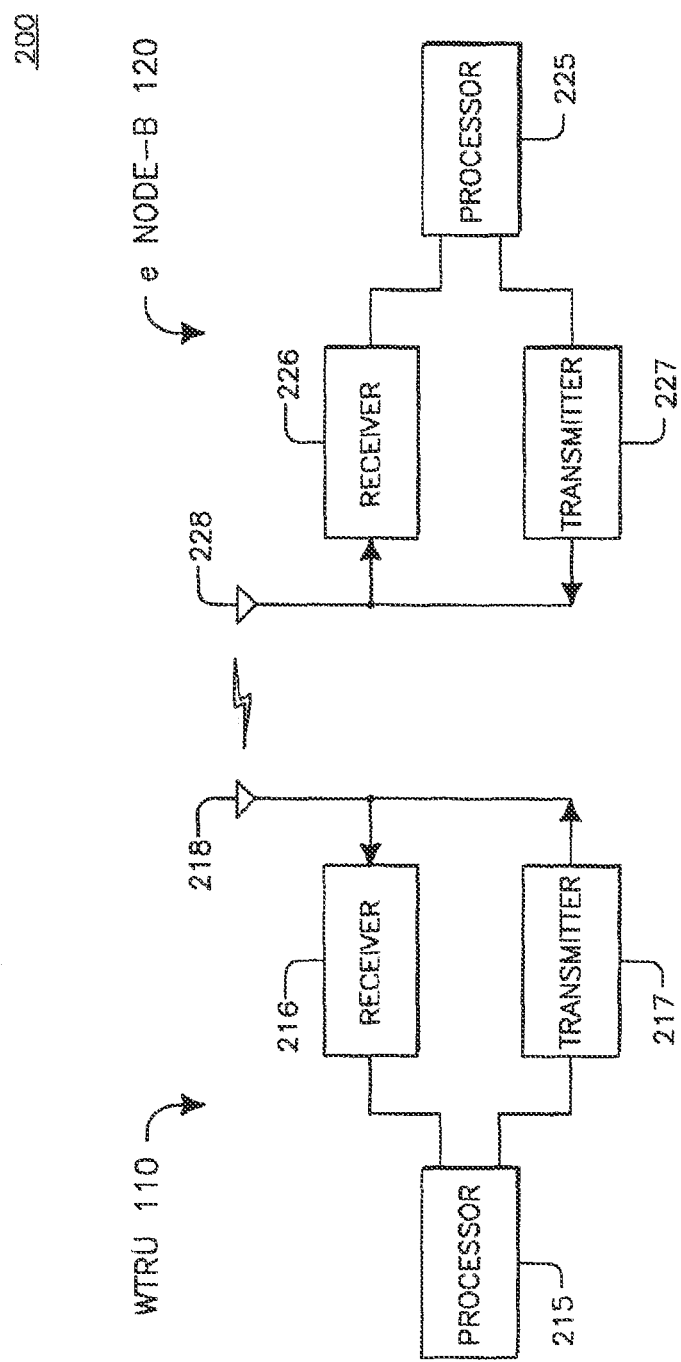
FIG. 2 is a functional block diagram of a WTRU and an e Node B (eNB) in accordance with one embodiment.

FIG. 2 is a functional block diagram 200 of a WTRU 110 and the eNB 120 of the wireless communication system 100 of FIG. 1. As shown in FIG. 1, the WTRU 110 is in communication with the eNB 120. Both WTRU 110 and eNB 120 may operate in DRX mode.

In addition to the components that may be found in a typical WTRU, the WTRU 110 includes a processor 215, a receiver 216, a transmitter 217, and an antenna 218. The processor 215 may be configured to adjust DRX cycle length as necessary. The receiver 216 and the transmitter 217 are in communication with the processor 215. The antenna 218 is in communication with both the receiver 216 and the transmitter 217 to facilitate the transmission and reception of wireless data.

In addition to the components that may be found in a typical eNB 120, the eNB 120 includes a processor 225, a receiver 226, a transmitter 227, and an antenna 228. The processor 225 is configured to communicate with the receiver 226 and transmitter 227 to adjust DRX cycles as necessary. The receiver 226 and the transmitter 227 are in communication with the processor 225. The antenna 228 is in communication with both the receiver 226 and the transmitter 227 to facilitate the transmission and reception of wireless data.

In order to improve battery life, but not limit the eNB 120 and WTRU 110 performance, transitions between DRX cycle length states may be defined implicitly, rather than explicitly. The implicit rules may be implemented at the radio resource control (RRC) and the medium access control (MAC) levels while the WTRU 110 is in a LTE_ACTIVE DRX state.

Approximately half of WTRU 110 to eNB 120 interaction involves WTRU 110 requests and reports and eNB 120 responses while the WTRU 110 is in LTE_ACTIVE DRX mode. When the WTRU 110 measures a particular scenario, measurement events may be reported to the eNB 120, and the eNB 120 may respond to the situation by commanding the WTRU 110 to start a new service, mobility activity, and the like. If the downlink command transmission or reception is limited by a relatively long DRX cycle length, WTRU 110 and eNB 120 system performance during LTE_ACTIVE DRX mode may suffer. However, certain measurement events may make good candidates for the anticipated network downlink commands.

Figure 3:
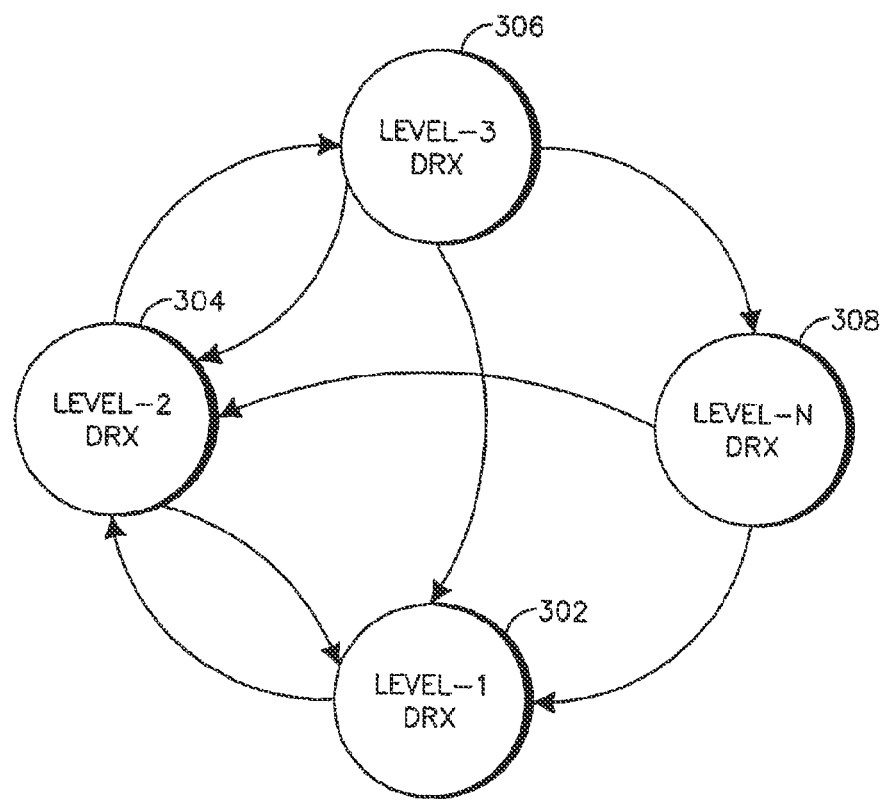
FIG. 3 is a state diagram of implicit DRX transition in accordance with one embodiment.

FIG. 3 shows an implicit DRX transition state machine 300 in accordance with one embodiment. The state machine 300, as well as associated transition mechanisms and parameter values, may be configured by the eNB (120 of FIG. 1). The state machine 300 may have a life span, also configured by the eNB 120. Each state may be applied at the WTRU (110 of FIG. 1) and at the eNB 120, so that operation is consistent and synchronized. At each defined and configured DRX state, a different DRX cycle length is associated with both the WTRU 110 and the eNB 120 operations.

The DRX cycle length transition rules may be based on WTRU 110 and eNB 120 experiences. Given a certain elapsed time, or a given set of measurement values, the WTRU 110 and the eNB 120 may learn and predict traffic patterns. These learned and predicted traffic patterns may be superimposed on a general model for a state machine, resulting in the DRX state machine 300 for a WTRU 110/eNB 120 system that permits implicit transition operation and consistent DRX actions for both the WTRU 110 and the eNB 120. The eNB 120 can prescribe DRX states for service and mobility conditions with the potential for continuous improvement and learned traffic patterns upon every invocation.

FIG. 3 shows 3 defined DRX levels, 302, 304, 306 and an undefined DRX level 308. In DRX level 3 306, the WTRU 110 is operating in a normal DRX cycle. The actual length of the normal state may be defined by the eNB 120. DRX level 2 304 is a shorter cycle length than DRX level 3 306, and is associated with more frequent activity than normal. The eNB 120 may also define the cycle length for DRX level 2 304, and may also set a "resume" period. A resume period is a length of time in which there are no new transmissions and after which the WTRU 110 may return to DRX level 3 306 operation, unless the WTRU 110 is commanded to do otherwise.

DRX level 1 302 has the shortest DRX cycle length, and may be used by a WTRU 110 or eNB 120 to handle predicted immediate downlink commands and when uplink traffic patterns are recognized by the WTRU 110 and the eNB 120 as requiring immediate downlink action, such as during a handover event, for example.

A DRX level n 308 may be configured with longer DRX cycles than that for the DRX Level 3 306. The eNB 120 can redefine the DRX cycle lengths for each state at the end of the DRX configuration life span but may observe a DRX cycle length rule that lower level DRX states have shorter DRX lengths.

For a WTRU 110 at DRX level 3 306, a timer or counter trigger may be defined to trigger a transition to DRX Level 2 304 if the eNB 120 determines that the WTRU 110 should periodically transition to a "busy" cycle to check downlink data. This may be considered a trigger based on a measurement event. Another trigger based on a measurement event can also be defined to transition a WTRU 110 from DRX level-3 306 to DRX Level 1 when a traffic volume event on a certain radio bearer accumulating a larger amount of uplink data than a threshold is reported and an anticipated Radio Bearer (RB) Reconfiguration command is imminent.

If the WTRU 110 in DRX Level 1 302 state receives a RB Reconfiguration command, the current DRX Level 1 state is over. If the WTRU 110 at DRX Level 1 state 302 does not receive the anticipated command for the defined "resume period", it can go back to its original DRX state and resume the power saving DRX cycle. Regular timers and counters may be used during a DRX mode to trigger the implicit DRX cycle length transition. The choice between the timers and counters and the values of the timers or counters may be based on learned traffic patterns and models with respect to the mobility and/or service state of the WTRU 110 at a particular time while the WTRU 110 is in LTE_ACTIVE DRX mode. The timer or counter triggers may be used as transition triggers to bring up the DRX cycle length as well as to bring down the DRX cycle length as the DRX state changes.

The eNB 120 may configure DRX parameters based on a network traffic monitoring operation and analysis. Several methods exist to select the parameter values, such as by including a default system value set that is defined for implicit DRX transition operation. Optionally, the parameters may be published in system information broadcasts, or they can be determined by the eNB 120 from time to time and loaded to a particular WTRU 110 via higher layer signaling before an intended DRX mode period.

Transitions between different states may be signaled in an information element (IE). An example of a skeleton for signaling an implicit DRX cycle transition is shown in Table 1. As shown in Table 1, the Implicit DRX Transition List is mandatory and is limited to a value indicating a maximum number of DRX states.

The DRX cycle length IE is mandatory, and is an integer. The trigger mechanisms are optional, and may be a trigger to move up a DRX state level, or move down a DRX state level. The Implicit DRX Transition configured life Span IE is mandatory, and sets the resume period for non-normal states. The Initial DRX state is optional, and may set the DRX state of the WTRU 110 at start-up.

To aid with easier DRX cycle length transition and maintain DRX cycle length synchronization between the WTRU 110 and the eNB 120, the DRX cycle length definition may be given as a function of the shortest DRX base number (L). Then various DRX length values may be:

$$\text{DRX-cycle-len} = L \times 2^n, \quad \text{Equation (1)}$$

where n=0, 1, 2 . . . such that the resulting DRX-cycle-len does not exceed a maximum DRX cycle length. The shortest DRX cycle length possible occurs when n=0, and is a fraction of a longer DRX cycle length.

The use of DRX cycle lengths that are multiples of each other reduces the probability that DRX periods may be mismatched and provides an efficient mechanism to resynchronize DRX periods between the WTRU 110 and eNB 120. When DRX periods are defined as multiples of each other, and when DRX periods become mismatched between the WTRU 110 and the eNB 120, each entity can determine the period of the other by increasing or decreasing the cycle length to determine the period being used by the other entity, and resynchronizing the entities accordingly.

Typically, a WTRU 110 in DRX Level 1 302 may count n times before it transits back to the original DRX state. The default may be given as: n=(Level-k DRX Cycle Length or original DRX cycle length)/Level-1 DRX Cycle Length; where Level-k cycle length is the length of the DRX cycle before the WTRU 110 enters DRX Level 1 302. Alternatively, the network may configure n for the "resume method".

TABLE 1

| Information Element/ Group name | Need | Multi | Type and reference | Semantics description |
|---|---|---|---|---|
| Implicit DRX Transition List | MP | maxDRXstates (TBD) | | |
| DRX Cycle Length | MP | | Integer (TBD) | |
| Trigger-UP-1 | OP | | Trigger Mechanism A.B.C.D | To next upper level DRX State |
| Trigger-UP-2 | OP | | Trigger Mechanism A.B.C.D | Used by Level-1 for resume |
| Trigger-Down-1 | OP | | Trigger Mechanism A.B.C.D | To next lower level DRX state |
| Trigger-Down-2 | OP | | Trigger Mechanism A.B.C.D | To Level-1 trigger |
| Implicit DRX Transition configured life span | MP | | TBD | Time in seconds |
| Initial DRX state | OP | | TBD | |

Transitions from state to state may be initiated by a trigger. Table 2 shows an example of transition trigger IEs. Each of the IEs is mandatory, except for the resume period. The Transition Trigger is mandatory and is specified by the network if specified as shown in Table 1. The CHOICE mechanism allows the network to configure the WTRU 110 for implicit DRX operational triggers. The trigger Timer value may be in units of absolute time, LTE frames or transmission time intervals (TTIs) and is used to monitor or regulate ON and OFF periods for network signaling channel activities or data channel activities for the WTRU 110. The Counter values may be an integer value used to check the occurrences of certain trigger events. The measurement event may enumerate the event that causes the trigger. The resume period may be a time period given in seconds, DRX cycles, or some other value, that denotes the total time a WTRU 110 may remain in an elevated state without receiving a command to move back to normal state.

TABLE 2

| Information Element/ Group name | Need | Multi | Type and reference | Semantics description |
|---|---|---|---|---|
| Transition Trigger | MP | | | |
| CHOICE mechanism Timer | MP | | | |
| Timer Value Counter | MP | | Integer TBD | |
| Counts Measurement Event | MP | | Integer TBD | |
| measurement Event-Id | MP | | Enumerated (TBD) | |
| resume period | CV-Trigger-UP-2 | | TBD | Could be default in Level-1 State. Default is to stay n Level-1 cycles so the total length is equivalent to its original DRX state DRX length |

Figure 4:
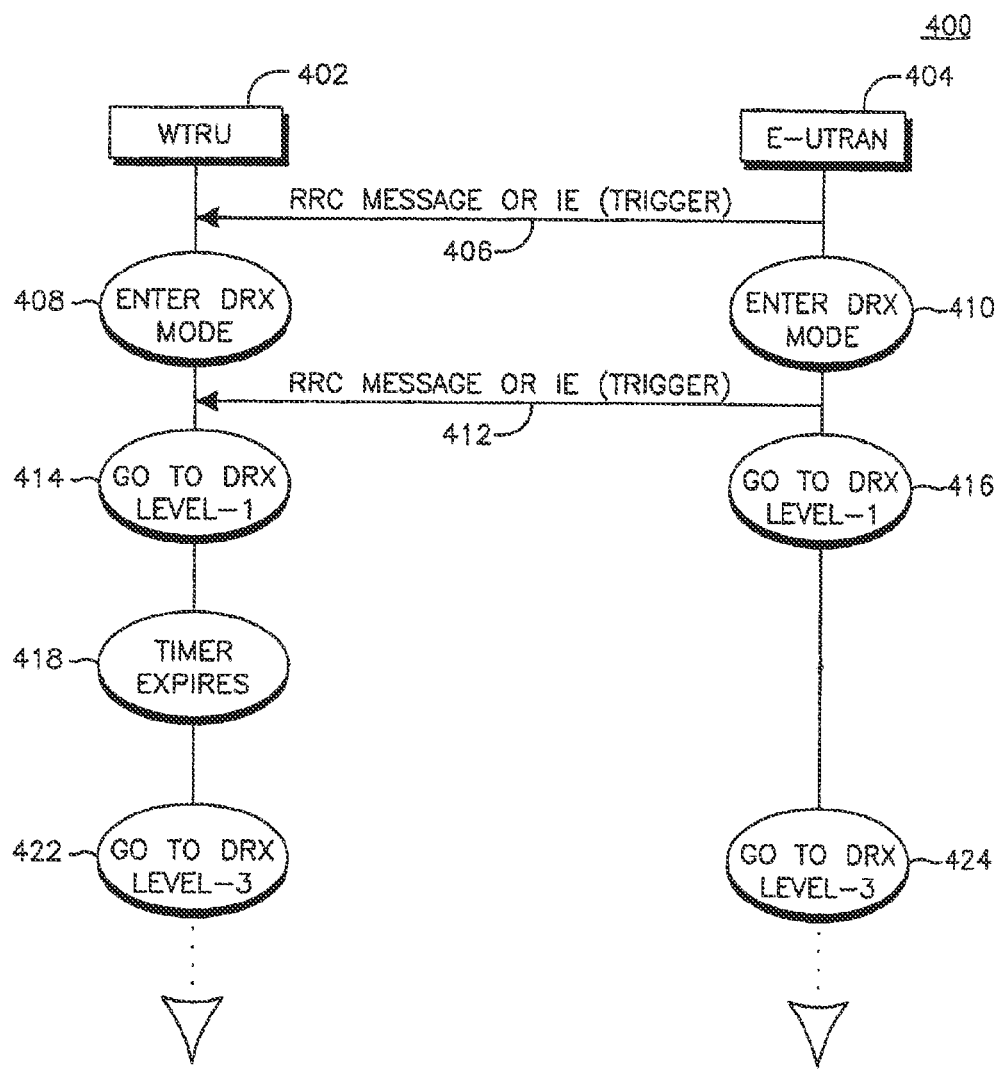
FIG. 4 is a signal flow diagram for implicit DRX transition in accordance with one embodiment.

FIG. 4 is a signal flow diagram for implicit DRX transition 400 in accordance with one embodiment. A WTRU 402 may receive an RRC message or an IE 406 from the E-UTRAN 404 that triggers the WTRU 402 to enter DRX mode. The WTRU 402 may enter DRX mode 408 at a default level which may be a normal cycle length DRX level 3 (306 of FIG. 3). Both the WTRU 402 and the E-UTRAN 404 enter DRX mode (408, 410 respectively). The WTRU 402 may receive another RRC message or IE 412 that triggers the WTRU 402 to enter a faster DRX cycle mode (DRX level 1 302 of FIG. 3). The WTRU 402 and the E-UTRAN 404 enter the DRX level 1 (414, 416 respectively). A WTRU timer 418, synchronized with an E-UTRAN timer (not shown), expires. As the timers are synchronized, no notice of timer expiration is required. The expiration of the timer 418 triggers the WTRU 402 and the E-UTRAN 404 to return to normal DRX level. The WTRU 402 returns 422 to DRX level-3 306 at the same time that the E-UTRAN 404 returns 424 to DRX level-3 306.

Figure 5:
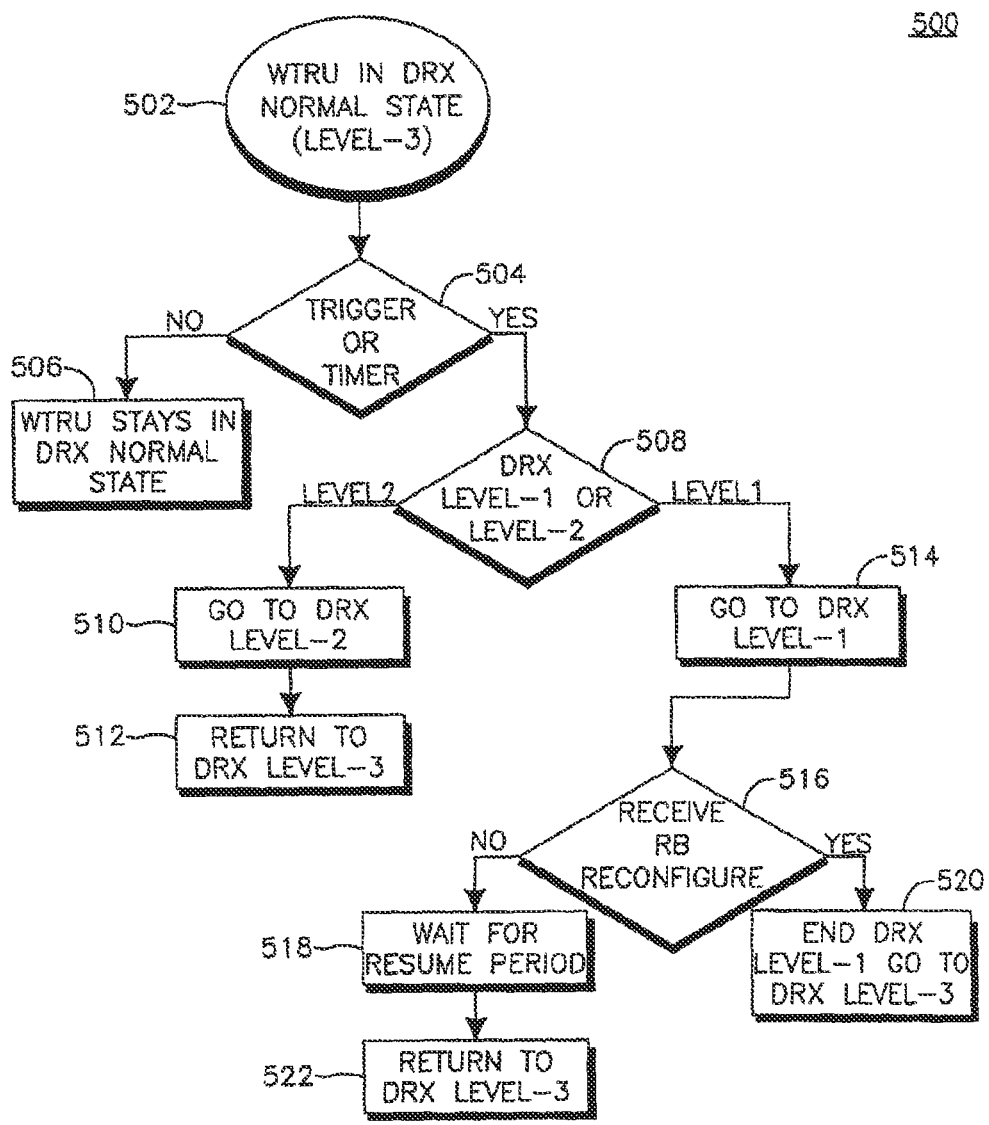
FIG. 5 is a flow diagram for a method of implicit DRX signaling in accordance with one embodiment.

FIG. 5 is a flow diagram of a method of implicit signaling 500 in accordance with one embodiment. At step 502 the WTRU is in normal operating mode, or Level-3. At step 504, the WTRU checks to see if a timer has timed-out, or a trigger has been received that would force the WTRU to move to another DRX state. If no, at step 506, the WTRU remains in normal state. If the WTRU detects a time out signal or a trigger at step 504, at step 508, the WTRU determines if it should move to DRX Level 1 or DRX level 2. If the WTRU determines that the trigger is a level-2 trigger, at step 510 the WTRU moves to DRX Level 2. At step 512, the WTRU determines that the resume period has ended, and returns to DRX level-3. If, however, the WTRU, at step 508, determines that it received a level 1 trigger, at step 514, the WTRU goes into a DRX level 1. At step, 516, the WTRU determines if it has received a Radio Bearer Reconfiguration message. If not, the WTRU, at step 518, waits for the resume period to end and returns to normal operation at step 522. If, however, at step 516, the WTRU receives a radio bearer reconfigure message, at step 520, the WTRU returns to normal DRX cycle operation.

Figure 6:
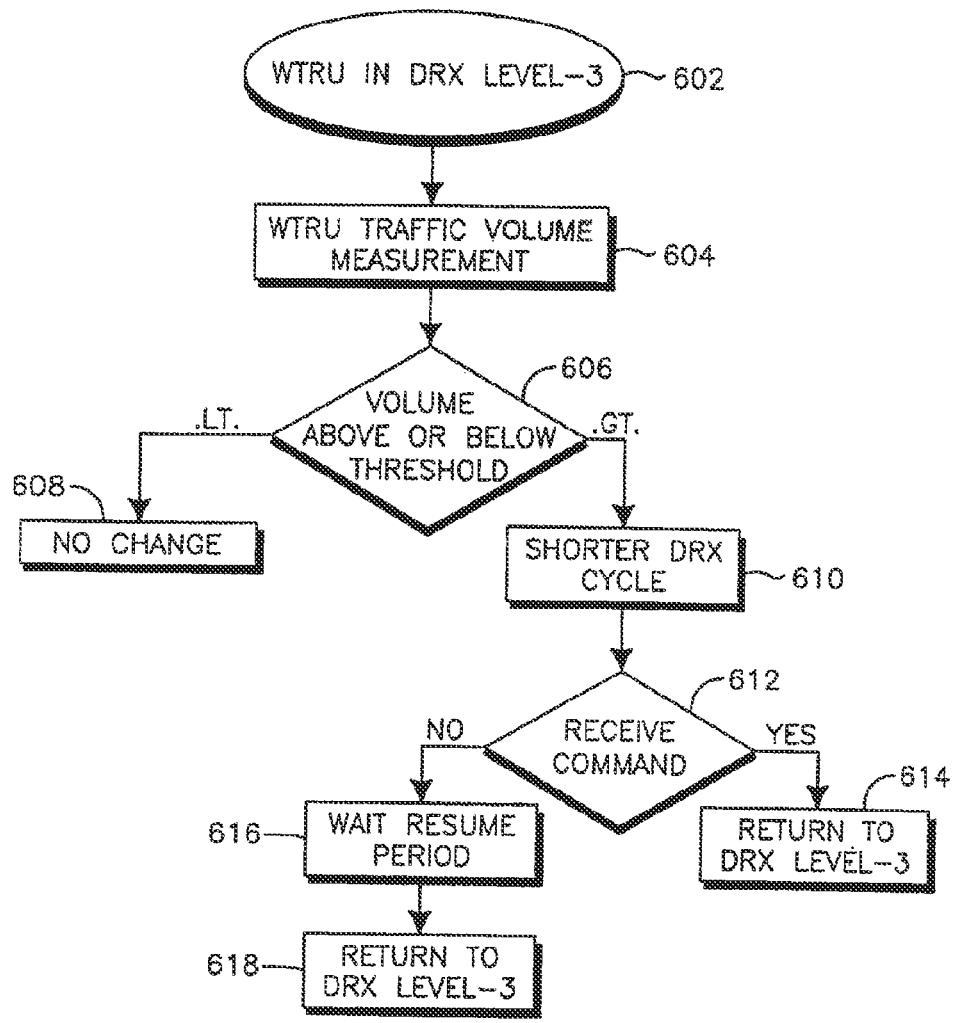
FIG. 6 is a flow diagram for a method of implicit DRX signaling in accordance with another embodiment.

FIG. 6 is a flow diagram of an implicit DRX method 600 in accordance with another embodiment. At step 602, the WTRU is in normal or DRX Level-3 mode. At step 604, the WTRU conducts a traffic volume measurement. At step 606, the WTRU compares the traffic volume measurement with a threshold. If the volume is below the threshold, at step 608, the WTRU takes no action and remains in DRX Level-3 mode. However, if, at step 606, the WTRU determines that the traffic is above a threshold, at step 610, the WTRU changes mode to a shorter DRX cycle. Based on the traffic, the new DRX mode may be DRX level-2 or DRX level-1. At step 612, the WTRU determines if a command or message has been received. If yes, at step 614, the WTRU returns to Level-3 mode. If not, at step 616 the WTRU waits the resume period before returning to level-3 mode at step 618. Optionally, the E-UTRAN may determine the traffic volume measurement reporting threshold level for DRX state transition triggering. Once the defined traffic volume measurement event occurs, the DRX state transition is triggered.

While in LTE_ACTIVE DRX mode, a WTRU may perform traffic volume measurements for uplink traffic. The E-UTRAN may configure the WTRU to report the events on threshold crossing. Based on learned traffic patterns, the E-UTRAN determines that there is a large volume change, which may means that an RB addition, an RB reconfiguration or an RB release command is imminent. Therefore, the traffic volume event reports may be used as implicit DRX transition triggers. For example, a large volume change may be used to trigger the WTRU into the shortest DRX cycle (DRX level 1, 302 of FIG. 3, for example) in order to receive the network command. The network, when receiving the predetermined measurement event, may determine the WTRU's DRX state via implicit DRX transition rules and either sends the anticipated command to the WTRU or wait for the WTRU to return to its previous DRX state with the specified "resume period".

Figure 7:
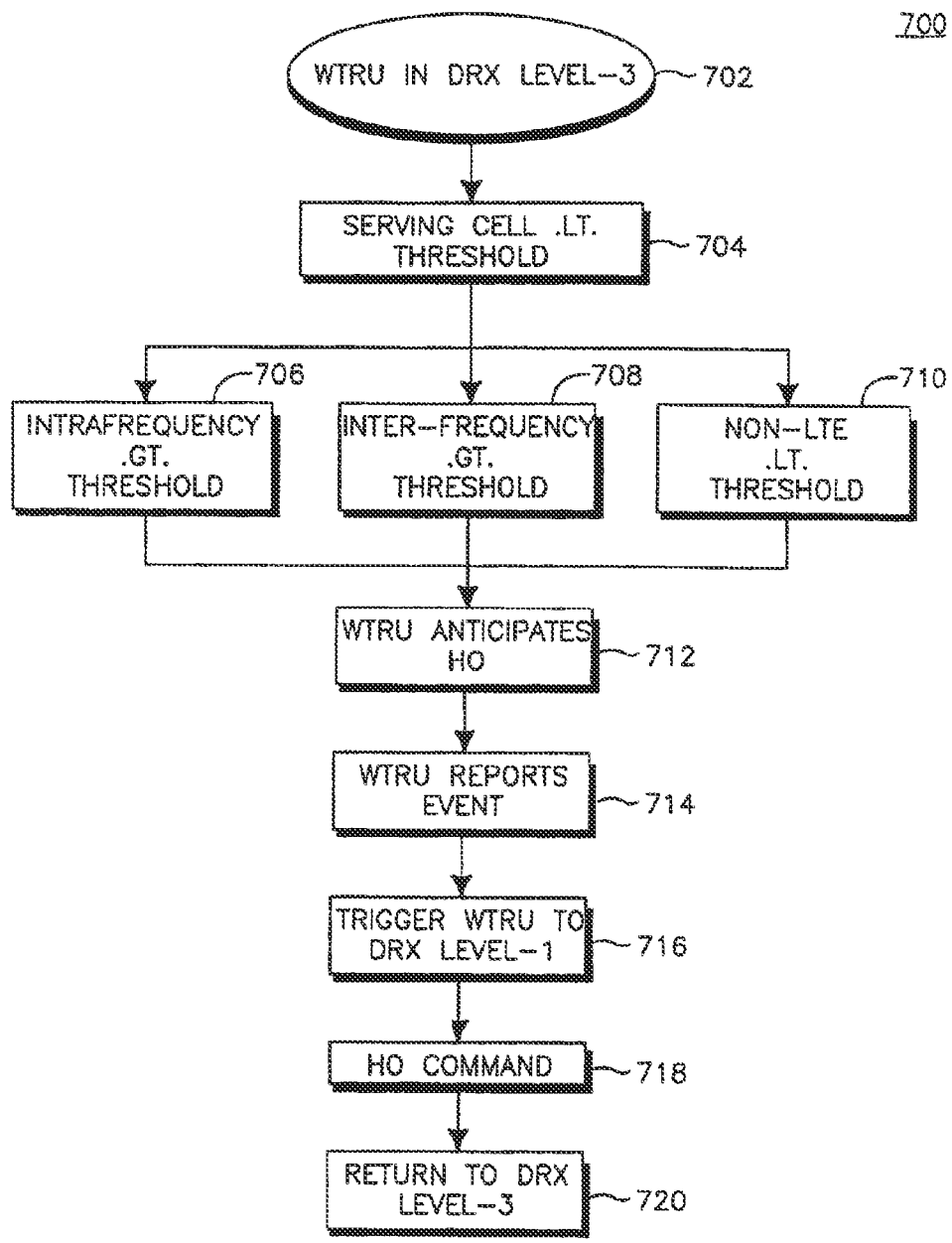
FIG. 7 is a flow diagram for a method of implicit DRX signaling in accordance with an alternative embodiment.

By way of another example, the WTRU, while in LTE_ACTIVE mode, may use configured handover measurements. Certain measurement event reports may indicate that a handover (HO) command is imminent for intra-frequency, inter-frequency or an inter-radio access technology (RAT) handover. Depending on handover measurement events, certain other measurement events may act as triggers for DRX transition control. FIG. 7 is a flow diagram of a method of implicit DRX signaling 700 in accordance with an alternative embodiment. At step 702, the WTRU is in normal DRX level 3 state. At step 704, the WTRU determines that a serving cell measurement is below a threshold. The WTRU may then determine that an intra-frequency measurement is high 706, meaning that an intra-frequency neighbor is measuring as the best cell. Alternatively, the WTRU may determine that an inter-frequency band measures to be the best 708. As another alternative, the WTRU may determine that a non-LTE system measures the best 710.

At step 712, the WTRU, due to the measurements, may anticipate a handover command. At step 714, the WTRU reports the measurement event. This may invoke, at step 716, an implicit DRX transition trigger that causes the WTRU to go to a Level-1 DRX state in order to receive the possible handover command from the network. At step 718, the WTRU receives the handover command. At step 720, the WTRU transitions back to its original DRX state.

Figure 8:
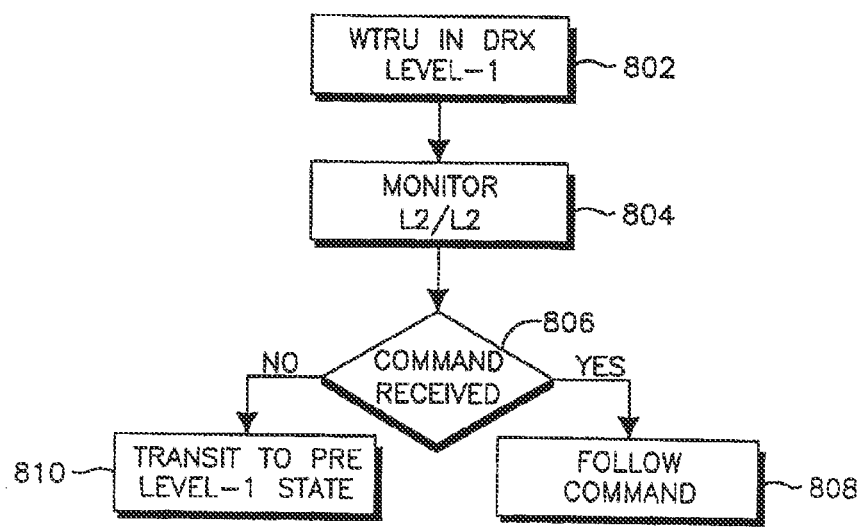
FIG. 8 is a flow diagram for a method of implicit DRX signaling in accordance with another alternative embodiment.

FIG. 8 is a flow diagram of a method of implicit DRX cycle signaling 800 in accordance with yet another embodiment. At step 802, the WTRU is level-1 mode. At step 804, the WTRU begins to monitor a Level 1/Level 2 control channel to intercept anticipated downlink commands. At step 806, the WTRU determines if an anticipated network command is received. If received, at step 808, the WTRU will follow the command to end the DRX mode or will receive instruction on the next DRX activity with the command. If the command is not received, at step 810, the WTRU transitions back to its original DRX state before entering the Level-1 state.

Although the features and elements are described in the embodiments in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit receive unit (WTRU), the WTRU comprising a processor configured to:

receive a message comprising a DRX configuration from a base station, the DRX configuration comprising a first DRX cycle length, a second DRX cycle length, and an indication of a resume period, wherein the indication of a resume period indicates a number of DRX cycles at which the WTRU is to perform DRX using the first DRX cycle length prior to implicitly transitioning to performing DRX using the second DRX cycle length if no new transmissions are received;

perform DRX using the first DRX cycle length;

determine that the WTRU has performed DRX using the first DRX cycle length for the number of DRX cycles indicated by the resume period without receiving a new transmission; and transition the WTRU from performing DRX using the first DRX cycle length to performing DRX using the second DRX cycle based on determining that the WTRU has performed DRX using the first DRX cycle length for the determined number of DRX cycles indicated by the resume period without receiving a new transmission, wherein the second DRX cycle length is a multiple of the first DRX cycle length.

2. The WTRU as in claim 1, wherein the processor is further configured to monitor a control channel for reception of downlink commands.

3. The WTRU as in claim 1, wherein a command received on a control channel causes the WTRU to change its DRX cycle length.

4. The WTRU as in claim 1, further comprising performing DRX using the second DRX cycle length prior to performing DRX using the first DRX cycle length.

5. The WTRU as in claim 1, wherein the message corresponds to a radio resource control (RRC) message, and the processor is configured to implement DRX operation at a Medium Access Control (MAC) level.

6. The WTRU as in claim 1, wherein the message comprising the DRX configuration is received via higher layer signaling.

7. The WTRU as in claim 1, wherein the processor is configured to determine to refrain from transitioning to performing DRX using the second DRX cycle length on condition that the WTRU receives a subsequent message from the base station while performing DRX using the first DRX cycle length.

8. The WTRU as in claim 7, wherein the subsequent message is a command, and the WTRU is configured to operate using the first DRX cycle length based on the command.

9. A wireless transmit receive unit (WTRU), the WTRU comprising a processor configured to:
receive a message comprising a DRX configuration from a base station, the DRX configuration comprising a first DRX cycle length, a second DRX cycle length, and an indication of a resume period, wherein the indication of a resume period indicates a number of DRX cycles at which the WTRU is to perform DRX using the first DRX cycle length prior to implicitly transitioning to performing DRX using the second DRX cycle length if no new transmissions are received;
perform DRX using the second DRX cycle length;
receive a trigger;
perform DRX using the first DRX cycle length based on receiving the trigger;
determine that the WTRU has performed DRX using the first DRX cycle length for the number of DRX cycles indicated by the resume period without receiving a new transmission; and
transition the WTRU from performing DRX using the first DRX cycle length to performing DRX using the second DRX cycle based on determining that the WTRU has performed DRX using the first DRX cycle length for the determined number of DRX cycles indicated by the resume period without receiving a new transmission, wherein the second DRX cycle length is a multiple of the first DRX cycle length.

10. The WTRU as in claim 9, wherein the second DRX cycle length is an integer power of two multiple of the first DRX cycle length.

11. The WTRU as in claim 9, wherein the first and second DRX cycle lengths are selected from a set of DRX cycle lengths given by the equation DRX-cycle-len $=L \times 2^n$, wherein n=0, 1, 2, . . ., and L is the length of a shortest DRX cycle.

12. The WTRU as in claim 9, wherein the second DRX cycle length is twice the first DRX cycle length.

13. The WTRU as in claim 9, wherein the resume period is synchronized with a base station.

14. The WTRU as in claim 9, wherein the processor is further configured to monitor a control channel for reception of downlink commands.

15. The WTRU as in claim 9, wherein a command received on a control channel causes the WTRU to change its DRX cycle length.

16. A method implemented by a wireless transmit receive unit (WTRU), the method comprising:
the WTRU receiving a message comprising a DRX configuration from a base station, the DRX configuration comprising a first DRX cycle length, a second DRX cycle length, and an indication of a resume period, wherein the indication of a resume period indicates a number of DRX cycles at which the WTRU is to perform DRX using the first DRX cycle length prior to implicitly transitioning to performing DRX using the second DRX cycle length if no new transmissions are received;
the WTRU performing DRX using the second DRX cycle length;
the WTRU receiving a trigger;
the WTRU performing DRX using the first DRX cycle length based on receiving the trigger;
the WTRU determining that the WTRU has performed DRX using the first DRX cycle length for the number of DRX cycles indicated by the resume period without receiving a new transmission; and
the WTRU transitioning performing DRX using the first DRX cycle length to performing DRX using the second DRX cycle based on determining that the WTRU has performed DRX using the first DRX cycle length for the determined number of DRX cycles indicated by the resume period without receiving a new transmission, wherein the second DRX cycle length is a multiple of the first DRX cycle length.

17. The method as in claim 16, wherein the second DRX cycle length is an integer power of two multiple of the first DRX cycle length.

18. The method as in claim 16, wherein the WTRU monitors a control channel for reception of downlink commands.

19. The method as in claim 16, wherein a command received on a control channel causes the WTRU to change its DRX cycle length.

* * * * *